(12) United States Patent
Abe et al.

(10) Patent No.: US 10,908,586 B2
(45) Date of Patent: Feb. 2, 2021

(54) PROGRAM CREATION APPARATUS AND PROGRAM CREATION METHOD IN PROGRAM CREATION APPARATUS

(71) Applicant: FANUC CORPORATION, Yamanashi (JP)

(72) Inventors: Hiroyuki Abe, Yamanashi-ken (JP); Kaoru Hiraga, Yamanashi-ken (JP); Shouta Irie, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/911,497

(22) Filed: Mar. 5, 2018

(65) Prior Publication Data

US 2018/0259936 A1 Sep. 13, 2018

(30) Foreign Application Priority Data

Mar. 10, 2017 (JP) .................. 2017-045695

(51) Int. Cl.
  *G05B 19/4097* (2006.01)
  *G05B 19/4093* (2006.01)
  *G05B 19/18* (2006.01)

(52) U.S. Cl.
  CPC ....... *G05B 19/4097* (2013.01); *G05B 19/182* (2013.01); *G05B 19/188* (2013.01); *G05B 19/40937* (2013.01); *G05B 2219/45043* (2013.01); *G05B 2219/45221* (2013.01); *Y02P 90/02* (2015.11)

(58) Field of Classification Search
  None
  See application file for complete search history.

(56) References Cited

U.S. PATENT DOCUMENTS

| 2008/0199266 | A1 | 8/2008 | Katoh et al. |
| 2014/0014625 | A1 | 1/2014 | Yamaoka et al. |
| 2014/0364992 | A1 | 12/2014 | Abe |

(Continued)

FOREIGN PATENT DOCUMENTS

| JP | 62218024 A | 9/1987 |
| JP | 2167621 A | 6/1990 |
| JP | 736524 A | 2/1995 |

(Continued)

OTHER PUBLICATIONS

Extended European Search Report for related Application No. EP 18160622.9, dated Jul. 20, 2018, 7 pgs.

(Continued)

*Primary Examiner* — Mohammad Ali
*Assistant Examiner* — Saad M Kabir
(74) *Attorney, Agent, or Firm* — Fredrikson & Byron, P.A.

(57) ABSTRACT

A program creation apparatus includes: a display unit configured to display a machining shape of a workpiece that is input by a user through an input unit; a core fixing portion setter for setting a predetermined range including a point on a machining line between the workpiece and a core to be formed by machining the workpiece, specified on the display unit with the machining shape of the workpiece displayed thereon, by the user through the input unit, as a core fixing portion; and a program creator for creating a program that causes the wire electrical discharge machine to fix the core to the workpiece in the set core fixing portion while machining the workpiece according to the input machining shape thereof.

4 Claims, 12 Drawing Sheets

(56) References Cited

U.S. PATENT DOCUMENTS

2015/0094845 A1    4/2015  Inukai et al.

FOREIGN PATENT DOCUMENTS

| JP | 2013144335 A | 7/2013 |
| JP | 5269258 B1 | 8/2013 |
| JP | 201414907 A | 1/2014 |

OTHER PUBLICATIONS

English Abstract and Machine Translation for Japanese Publication No. 07-036524 A, published Feb. 7, 1995, 11 pgs.
English Abstract and Machine Translation for Japanese Publication No. 02-167621 A, published Jun. 28, 1990, 10 pgs.
English Abstract for Japanese Publication No. 2014-014907 A, published Jan. 30, 2014, 2 pgs.
English Abstract for Japanese Publication No. 5269258 B1, published Aug. 21, 2013, 2 pgs.
English Abstract and Machine Translation for Japanese Publication No. 2013-144335 A, published Jul. 25, 2013, 9 pgs.
English Abstract and Machine Translation for Japanese Publication No. 62-218024 A, published Sep. 25, 1987, 5 pgs.

PROGRAM CREATION APPARATUS AND PROGRAM CREATION METHOD IN PROGRAM CREATION APPARATUS

CROSS-REFERENCE TO RELATED APPLICATION

This application is based upon and claims the benefit of priority from Japanese Patent Application No. 2017-045695 filed on Mar. 10, 2017, the contents of which are incorporated herein by reference.

BACKGROUND OF THE INVENTION

Field of the Invention

The present invention relates to a program creation apparatus for creating a program for controlling a wire electrical discharge machine and a program creation method in a program creation apparatus.

Description of the Related Art

Japanese Patent No. 5269258 discloses a machining program creation apparatus for creating a machining program so as to designate a core fixing portion on CAM software and perform a core fixing process on a designated core fixing portion.

Japanese Laid-Open Patent Publication No. 2013-144335 discloses a machining program creation apparatus for creating a machining program by setting the number of portions where a core is to be fixed and the regions of the fixing portions, based on the weight and the center of gravity of the core calculated from the shape data of the core.

SUMMARY OF THE INVENTION

In the technique of Japanese Patent No. 5269258, a core fixing portion is designated as follows. First, a machining shape element to be subjected to a core fixing process is designated by the cursor. Next, one end point of the designated machining shape element is set as a reference point. Then, the distance from the reference point to the core fixing portion and the section where the core fixing process is performed are entered. These procedures require much time and labor of the user to designate a core fixing portion, hence put a heavy burden on the user.

In the technique of Japanese Laid-Open Patent Publication No. 2013-144335, since the number of portions to fix a core and the regions of the fixing portions are set based on the weight and the center of gravity calculated from the shape data of the core, the burden on the user can be reduced. However, there is a risk, for example, that a core fixing portion is designated at an area which is not suitable for core fixing, such as a place where the machining shape is complicated.

The present invention has been devised to solve the above problem. An object of the present invention is to provide a program creation apparatus and a program creation method in the program creation apparatus, which enable easy setting of a core fixing portion in a suitable area.

The first aspect of the present invention resides in a program creation apparatus for creating a program that controls a wire electrical discharge machine, comprising: a display unit configured to display a machining shape of a workpiece that is input by a user through an input unit; a core fixing portion setter configured to set a predetermined range including a point on a machining line between the workpiece and a core to be formed by machining the workpiece, specified on the display unit with the machining shape of the workpiece displayed thereon, by the user through the input unit, as a core fixing portion for fixing the core to the workpiece; and a program creator configured to create a program that causes the wire electrical discharge machine to fix the core to the workpiece in the set core fixing portion while machining the workpiece according to the input machining shape thereof.

The second aspect of the present invention resides in a program creation method for use in a program creation apparatus for creating a program that controls a wire electrical discharge machine, wherein the program creation apparatus includes a display unit configured to display a machining shape of a workpiece that is input by a user through an input unit, comprising: a core fixing portion setting step of setting a predetermined range including a point on a machining line between the workpiece and a core to be formed by machining the workpiece, specified on the display unit with the machining shape of the workpiece displayed thereon, by the user through the input unit, as a core fixing portion for fixing the core to the workpiece; and a program creation step of creating a program that causes the wire electrical discharge machine to fix the core to the workpiece in the set core fixing portion while machining the workpiece according to the input machining shape thereof.

According to the present invention, it is possible to easily set a core fixing portion in a suitable position.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Now, the present invention will be described referring to embodiments of the invention. The following embodiments will not limit the invention according to the claims. Not all combinations of features described in the embodiments are necessarily essential to the solving means of the invention.

First Embodiment

[Configuration of Program Creation Apparatus]

Figure 1:
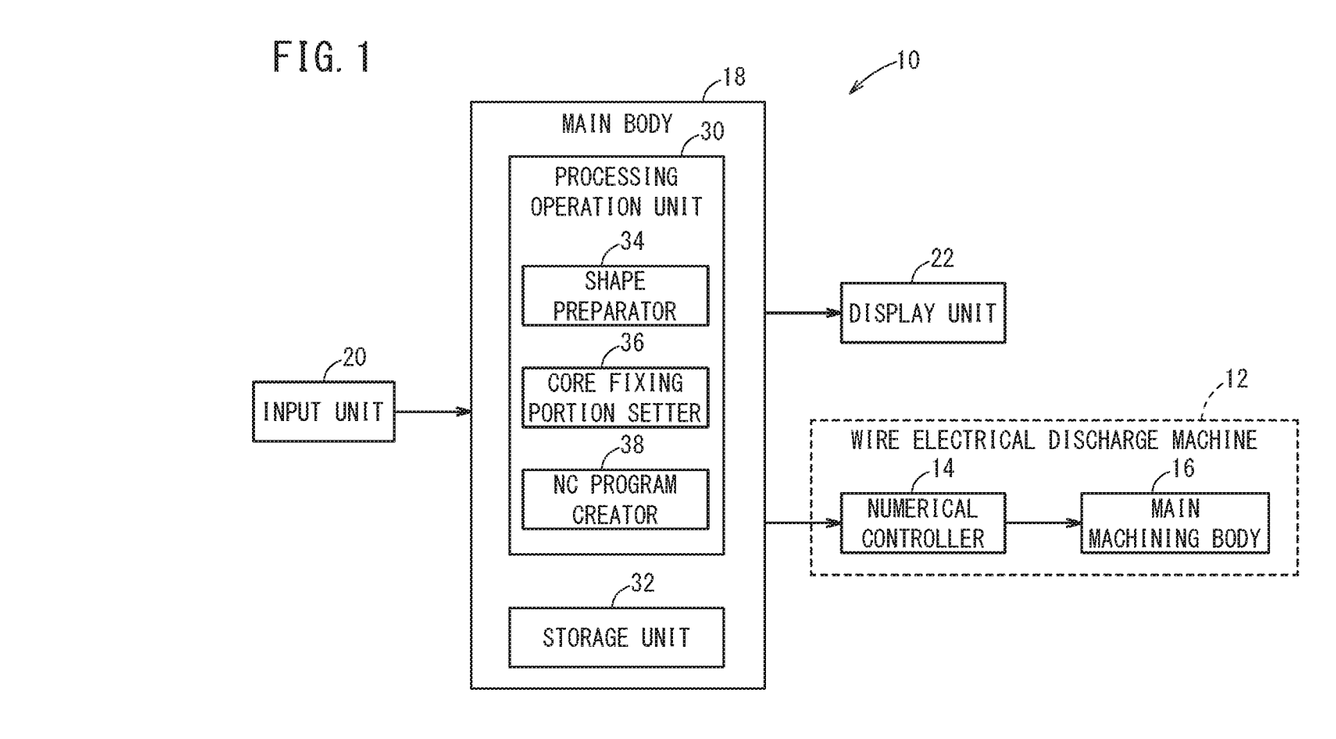
FIG. 1 is a block diagram showing a program creation apparatus and a wire electrical discharge machine according to the first embodiment.

FIG. 1 is a block diagram showing a program creation apparatus 10 and a wire electrical discharge machine 12. The program creation apparatus 10 is, for example, a personal computer or the like on which CAM (computer aided manufacturing) software is installed. The program creation apparatus 10 receives input of a machining shape on a workpiece W (FIG. 3) from a user to create an NC program for controlling the wire electrical discharge machine 12 in accordance with the input shape of machining on the workpiece W. In the program creation apparatus 10, the created NC program is transferred to a numerical controller 14 of the wire electrical discharge machine 12. The numerical controller 14 runs the NC program to calculate command values for various devices of a main machining body 16. The command values are sent from the numerical controller 14 to various devices of the main machining body 16, so that the various devices operate according to the command values to thereby machine the workpiece W.

The program creation apparatus 10 includes a main body 18, an input unit 20 and a display unit 22. The main body 18 has a processing operation unit 30 and a storage unit 32. The processing operation unit 30 is composed of a processor, a memory and the like to perform various processes, calculations and others. The storage unit 32 may include a hard disk or the like and stores executable files for CAM, created NC programs and the like. The input unit 20 may include, for example, a keyboard, a mouse and others. As the user operates the input unit 20, it is possible to input characters, symbols, numerals, etc., designate a position on the display unit 22, select an icon etc., displayed on the display unit 22 and perform other control. The display unit 22 may be, for example, a liquid crystal display or the like, and can display characters, symbols, numbers, images and the like.

The processing operation unit 30 includes a shape preparator 34, a core fixing portion setter 36 and an NC program creator 38. The shape preparator 34 creates a shape designated by the user's operation through the input unit 20 as a shape for machining the workpiece W and display the created machining shape of the workpiece W on the display unit 22. The core fixing portion setter 36 sets a core fixing portion F (FIG. 5) for fixing a core C (FIG. 3) to the workpiece W at a place designated by the user's operation through the input unit 20 and displays the set core fixing portion F on the display unit 22. The NC program creator 38 creates an NC program according to the created machining shapes of the workpiece W and the set core fixing portions F.

The core C is formed at the time of rough machining (primary machining) of the workpiece W. In fixing the core C to the workpiece W, the main machining body 16 is controlled so that electric power applied to the wire electrode is changed from that applied at the time of cutting the workpiece W so as to deposit the component of the wire electrode to both the workpiece W and the core C and fill the kerf therebetween. Thereby, during the machining of the workpiece W, the core C is kept from falling off the workpiece W, and then the core C can be removed from the workpiece W by giving impacts on the core C after completion of the primary machining.

[Control Flow]

Figure 2:
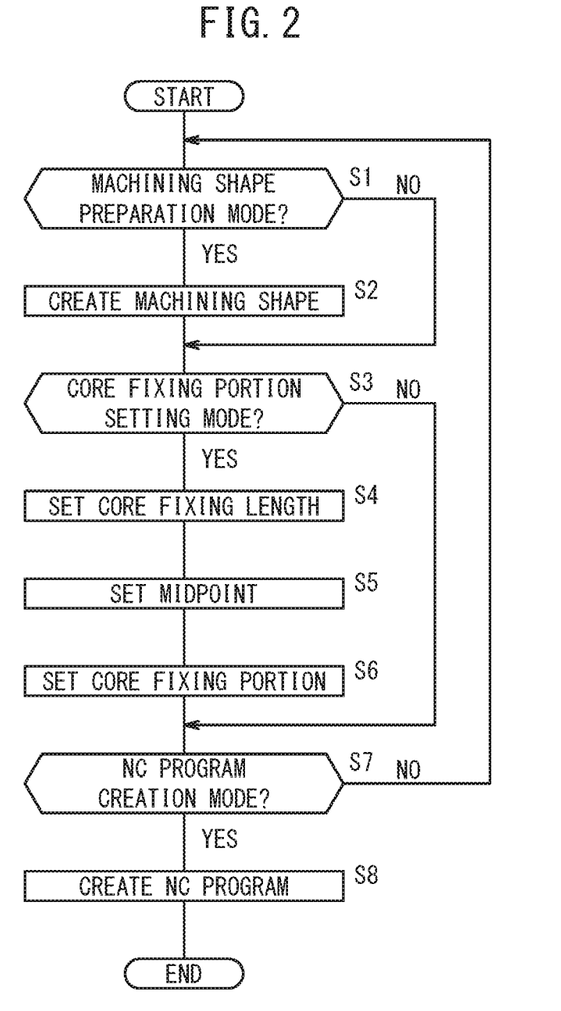
FIG. 2 is a flowchart showing the flow of processing performed in the processing operation unit in the first embodiment.

FIG. 2 is a flowchart showing the flow of processing performed in the processing operation unit 30. At step S1, it is determined that whether or not the shape preparator 34 is in the machining shape preparation mode. When the machining shape preparation mode is in progress, the control goes to step S2; otherwise, the control goes to step S3. For example, the shape preparator 34 detects the fact that the user has clicked a machining shape preparation mode icon (not shown) displayed on the display unit 22 with the mouse, and determines that the machining shape preparation mode is on.

Figure 3:
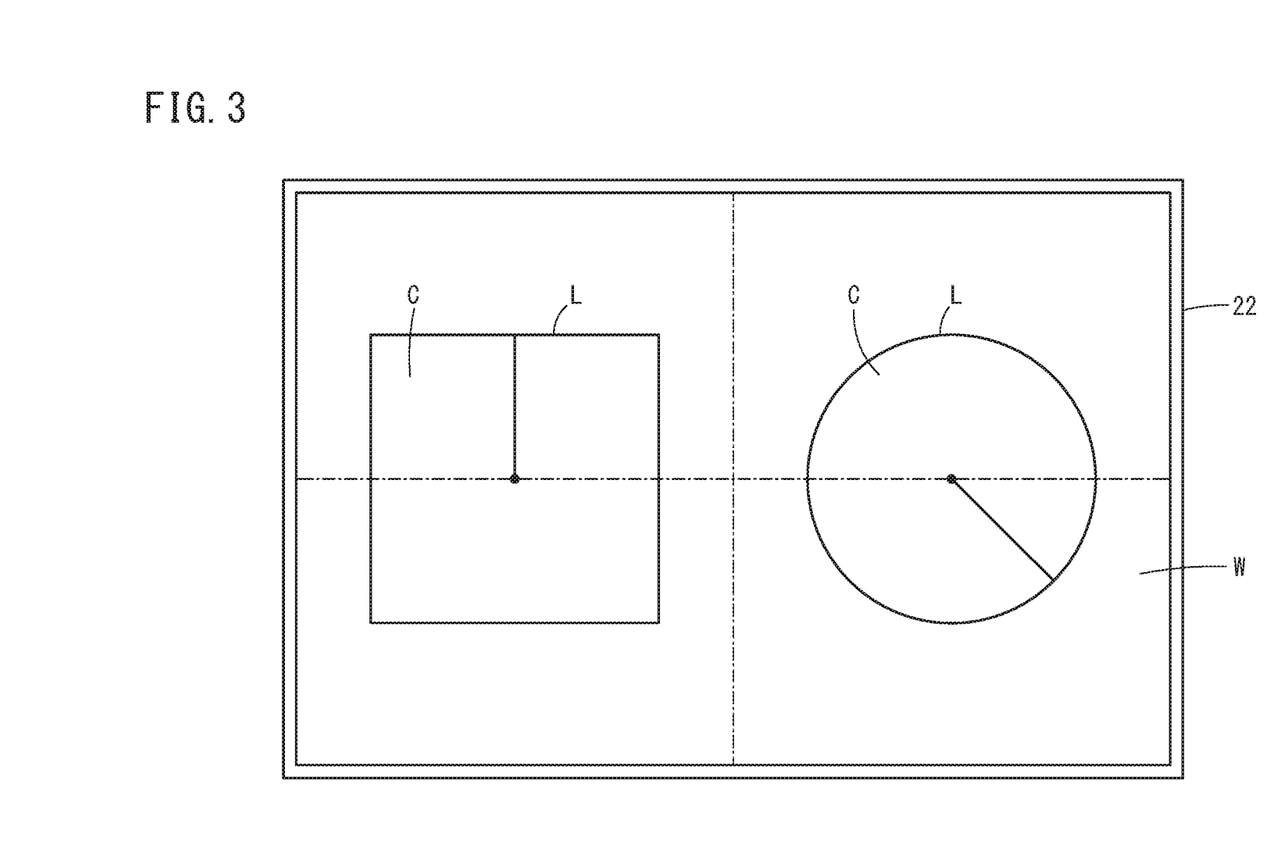
FIG. 3 is a diagram showing an example of a machining shapes in a workpiece and shapes of cores displayed on a display unit in the first embodiment.

At step S2, the shape preparator 34 creates a machining shape of the workpiece W, and the control goes to step S3. For example, the user clicks icons (not shown) displayed on the display unit 22 with the mouse to designate linear segments, curved segments and others. Then, the user inputs numerical values through the keyboard to designate the lengths of the linear segments, the radii of curved segments and other properties. The shape preparator 34 creates a shape designated by the user as the machining shape of the workpiece W. Further, the shape preparator 34 creates a shape of the core C from the machining shape of the created workpiece W. Further, the shape preparator 34 computes control signals for displaying the created machining shape of the workpiece W and the shape of the core C on the display unit 22 and outputs the control signals to the display unit 22. The display unit 22 displays the machining shape of the workpiece W and the shape of the core C on the screen based on the control signals. FIG. 3 is a diagram showing an example of machining shapes in the workpiece W and shapes of cores C displayed on the display unit 22. In the example of FIG. 3, two machining shapes, a square shape and a circular shape, are created in the workpiece W.

At step S3, it is determined whether or not the core fixing portion setter 36 is in the core fixing portion setting mode. When the core fixing portion setting mode is in progress, the control goes to step S4; otherwise, the control goes to step S7. For example, the core fixing portion setter 36 detects the fact that the user has clicked a core fixing portion setting mode icon (not shown) displayed on the display unit 22 with the mouse, and determines that the core fixing portion setting mode is on.

At step S4, the core fixing portion setter 36 sets a core fixing length, then the control goes to step S5. The core fixing length is the length of the core fixing portion F. For example, the core fixing portion setter 36 sets a numerical value that is input as the core fixing length by the user through the keyboard. In the present embodiment, the core fixing length is set at 10 [mm].

Figure 4:
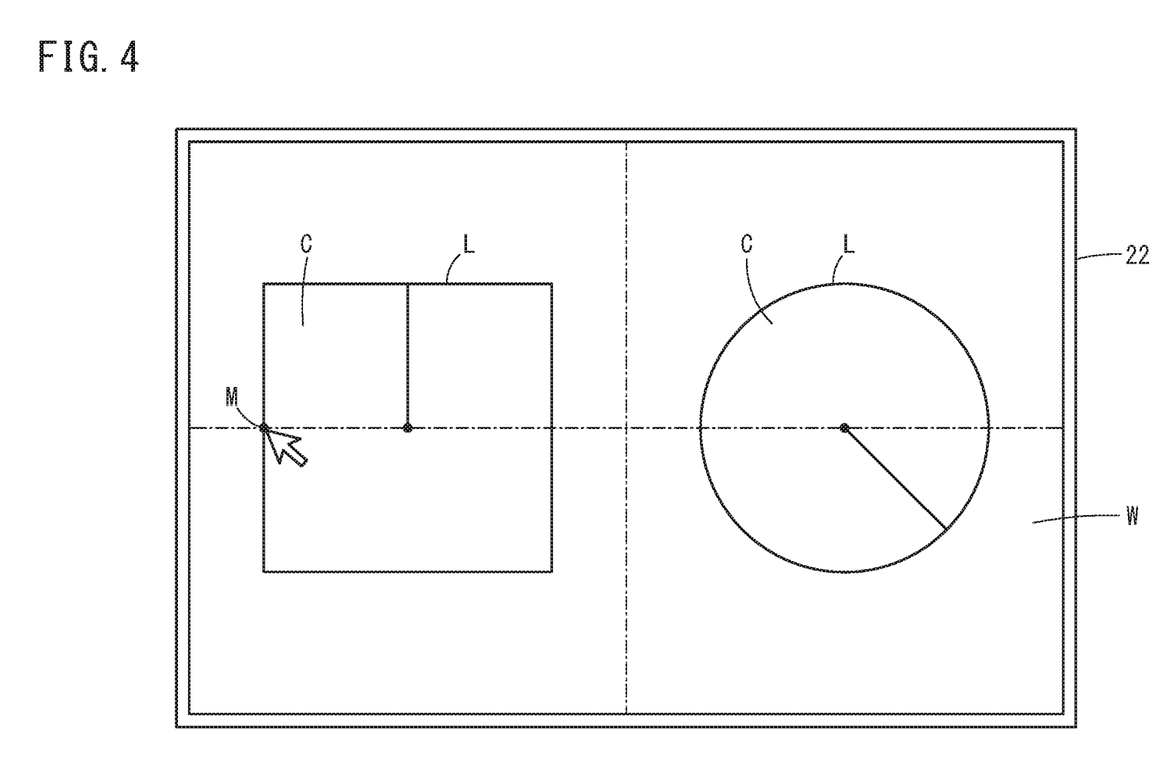
FIG. 4 is a diagram showing a state in which the midpoint is set on the machining line of the workpiece displayed on the display unit in the first embodiment.

At step S5, the core fixing portion setter 36 sets the midpoint M of the core fixing portion F, then the control goes to step S6. For example, the core fixing portion setter 36 sets the position which the user clicks with the mouse on the machining line L with the workpiece W displayed on the display unit 22, as the midpoint M. FIG. 4 is a diagram showing a state in which the midpoint M has been set on the machining line L of the workpiece W displayed on the display unit 22.

Figure 5:
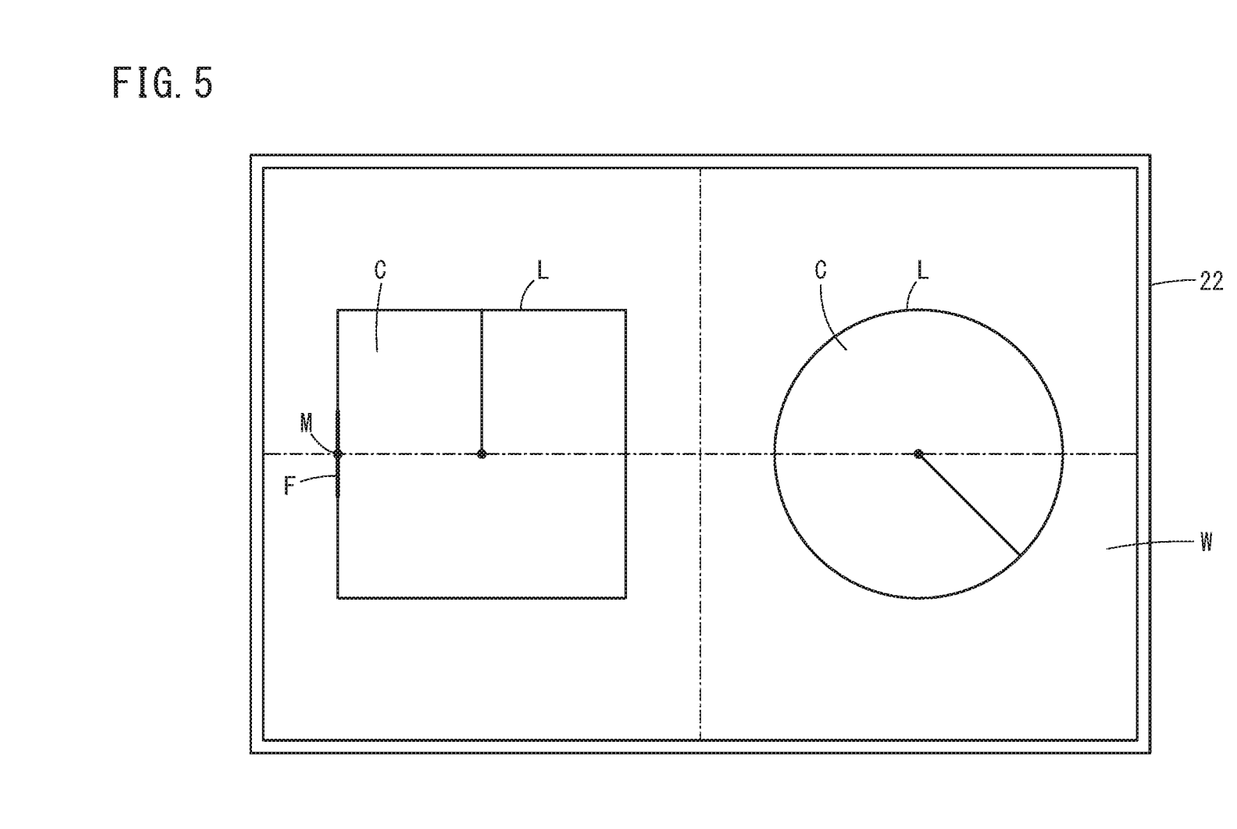
FIG. 5 is a diagram showing an example of setting a core fixing portion on the machining line of the workpiece displayed on the display unit in the first embodiment.

At step S6, the core fixing portion setter 36 sets the core fixing portion F, then the control goes to step S7. The core fixing portion setter 36 sets the core fixing portion F so as to have a form including the midpoint M and extended along the machining line L within the core fixing length designated at step S4. FIG. 5 is a diagram showing an example of setting the core fixing portion F on the machining line L of the workpiece W displayed on the display portion 22. In the example of FIG. 5, the core fixing portion F includes the midpoint M and is set within a range of 5 mm from the midpoint M along the machining line L.

At step S7, it is determined in the NC program creator 38 whether or not the NC program generation mode is in progress. When the NC program generation mode is in progress, the control goes to step S8; otherwise, the control goes to step S1. For example, the NC program creator 38 detects the fact that the user has clicked an NC program generation mode icon (not shown) displayed on the display unit 22 with the mouse, and determines that the NC program generation mode is on.

At step S8, the NC program creator 38 creates an NC program and terminates the procedure. The NC program creator 38 creates an NC program based on the machining shape created at step S2 and the core fixing portion F set at step S6.

Figure 6:
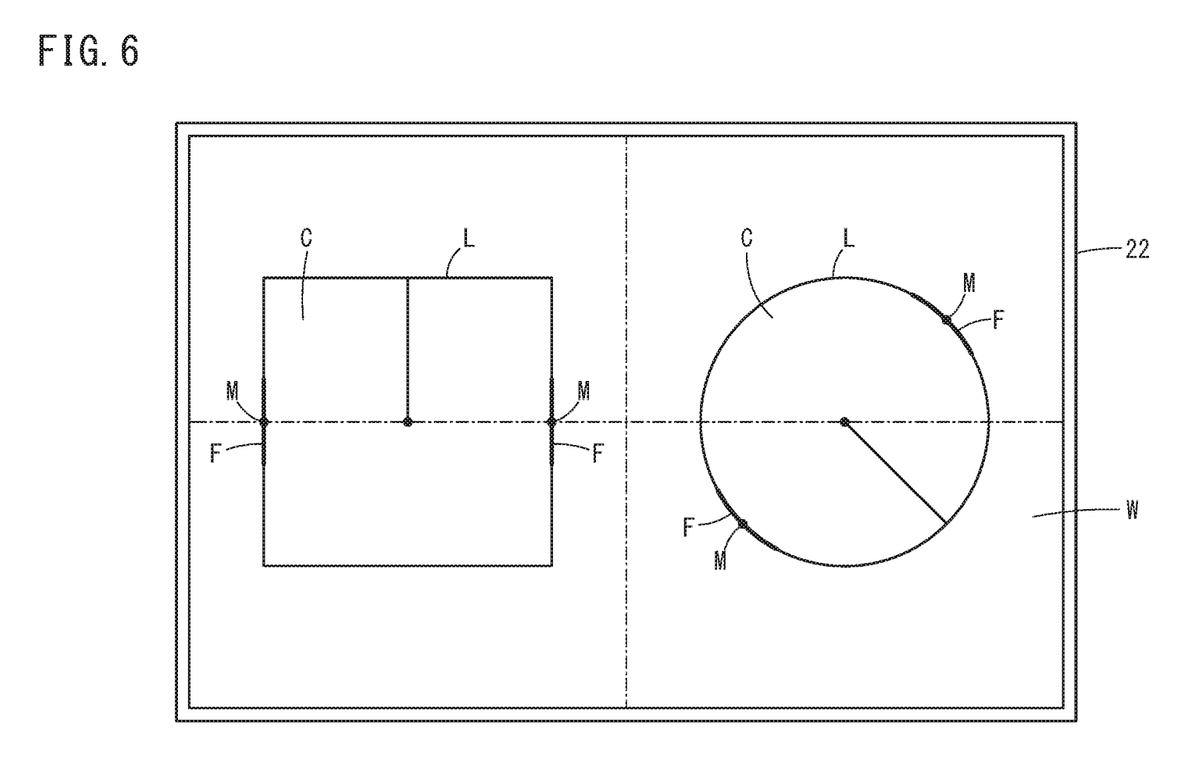
FIG. 6 is a diagram showing a display example on the display unit in a state where core fixing portions have been set in the first embodiment.

FIG. 6 is a diagram showing a display example on the display unit 22 when the setting of core fixing portions F has been completed. As long as the user continues to select the core fixing portion setting mode, the decisions at step S1 and step S7 are denied and the procedures at steps S3 to S6 are repeated. Thus, multiple core fixing portions F can be set, as shown in FIG. 6.

[NC Program]

Figure 7A:
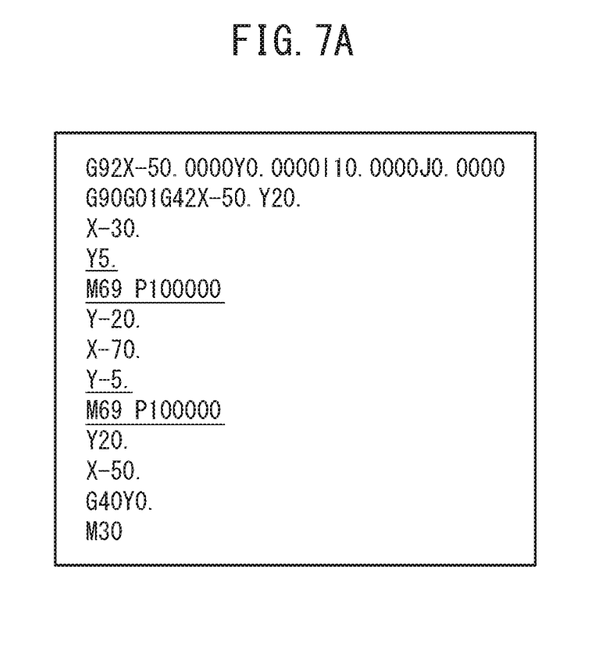
FIG. 7A is an NC program for machining the workpiece on the left side in FIG. 5 and fixing its core to the workpiece in the first embodiment.
Figure 7B:
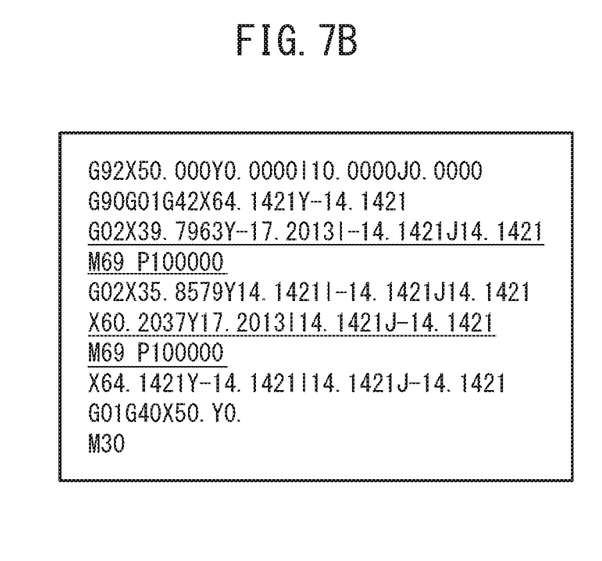
FIG. 7B is an NC program for machining the workpiece on the right side in FIG. 5 and fixing its core to the workpiece in the first embodiment.

FIG. 7A shows an NC program for cutting the workpiece W in a square shape while fixing the core C to the workpiece W, as illustrated in the left part of FIG. 6. FIG. 7B shows an NC program for cutting the workpiece W in a circular shape while fixing the core C to the workpiece W, as illustrated on the right part of FIG. 6. Each of the NC programs shown in FIGS. 7A and 7B is composed of instructions for cutting the workpiece W in the machining shape and underlined instructions for fixing the core C to the workpiece W.

As shown in FIGS. 7A and 7B, in the NC programs, an instruction designating the start point of the core fixing portion F is written, and followed by an instruction specifying the length of the core fixing portion F from the start point.

[Operation and Effect]

Quite a few users have conventionally used CAM software that creates an NC program in accordance with a machining shape of a workpiece W input by the user. However, the CAM software packages that enable the user to add instructions for fixing cores to the NC program are not yet general, and in many cases, it is a usual practice that the user directly edits the NC program created based on the machining shape of the workpiece W to add instructions for fixing cores.

In order to add instructions for core fixing, the user first needs to make out the NC program generated by CAM according to the machining shape of the workpiece W, and locate the lines to which the core fixing instructions should be added. Then, the user edits the NC program and adds an instruction for specifying the start point of the core fixing portion F and an instruction for designating the length of the core fixing portion F from the start point. When the machining shape of the workpiece W is complicated, the NC program generated by the CAM becomes long and it is burdensome for the user to locate the line to which core fixing instructions should be inserted. Further, in order to add an instruction to designate the start point of the core fixing portion F, the user has to find the coordinate values of the starting point of the core fixing portion F. Even if the machining shape is of a relatively simple circular shape, the user needs to calculate the coordinates of the start point of the fixing portion F using trigonometric functions etc., as shown in the third and sixth lines of the NC program of FIG. 7B, which imposes a burden on the user.

In order to reduce the burden on the user, proposals for automatic determination of core fixing portions F have been conventionally presented. For example, there is a method in which the center of gravity and weight of the core C are calculated from its shape so as to determine core fixing portions F based on the calculated center of gravity and weight of the core C. However, if the core fixing portions F are set at positions where the machining shape of the workpiece W is complicated, there is a risk that part of the workpiece W is chipped when impact is applied to the core C at the time of removal of the core C.

Alternatively, there have been presented proposals for alleviating the user burden for specifying core fixing portions F though those methods still require the user to specify the core fixing portions F. One example is to set a core fixing portion F by selecting one element of the machining shape for which a core fixing portion F is formed, assuming one end point of the selected element as a reference point and designating the distance from the reference point to the start point of the core fixing portion F and the length from the start point. However, if the core fixing portion F is set so as to extend over two or more elements of the machining shape, it is necessary for the user to repeatedly specify the core fixing portion F for every element. Thus, the effect of reducing user burden has been insufficient.

Therefore, in the present embodiment, the core fixing portion setter 36 allows the user to designate a position on the machining line L lying between the workpiece W and the core C displayed on the display unit 22 by means of the input unit 20 to set a midpoint M. Then, the core fixing portion setter 36 creates a core fixing portion F within a predetermined length of core fixing including the midpoint M. The NC program creator 38 creates an NC program that will fix the core C to the workpiece W in the core fixing portion F.

Thus, the user can set the core fixing portion F at a desired position on the machining line L by simply specifying the position to be the midpoint M, and create an NC program for fixing the core at the core fixing portion F. As a result, it is possible to easily set core fixing portions F at appropriate positions, hence reduce the burden on the user.

Further, since the point specified by the user on the machining line L forms the middle point, i.e., midpoint M of the core fixing portion F, the user can specify a core fixing portion F on the machining line L without considering the machining direction thereat.

Second Embodiment

In second embodiment, the user designates a midpoint M of a core fixing portion F in a way different from that of the first embodiment.
[Control Flow]

Figure 8:
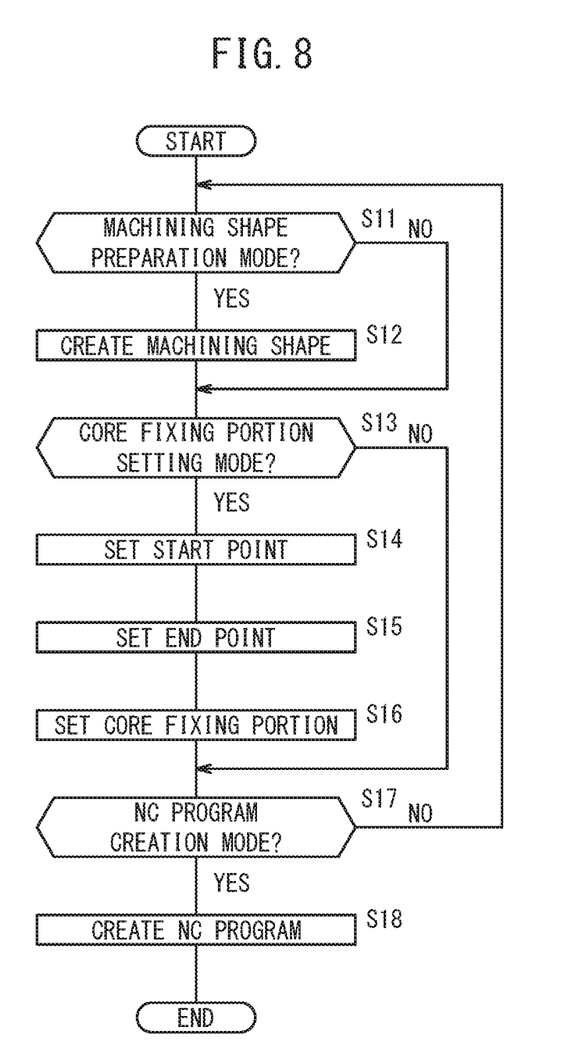
FIG. 8 is a flowchart showing the flow of processing performed in the processing operation unit in the second embodiment.

FIG. 8 is a flowchart showing the flow of processing performed in the processing operation unit 30. At step S11, it is determined whether or not the shape preparator 34 is in the machining shape preparation mode. When the machining shape preparation mode is in progress, the control goes to step S12; otherwise, the control goes to step S13.

At step S12, the shape preparator 34 creates a machining shape of the workpiece W, and the control goes to step S13.

At step S13, it is determined whether or not the core fixing portion setter 36 is in the core fixing portion setting mode. When the core fixing portion setting mode is in progress, the control goes to step S14; otherwise, the control goes to step S17.

At step S14, the core fixing portion setter 36 sets a point S as the start point of a core fixing portion F, and the control goes to step S15. The core fixing portion setter 36 sets the position which the user clicks with the mouse on the machining line L of the workpiece W displayed on the display unit 22, as the start point S.

Figure 9:
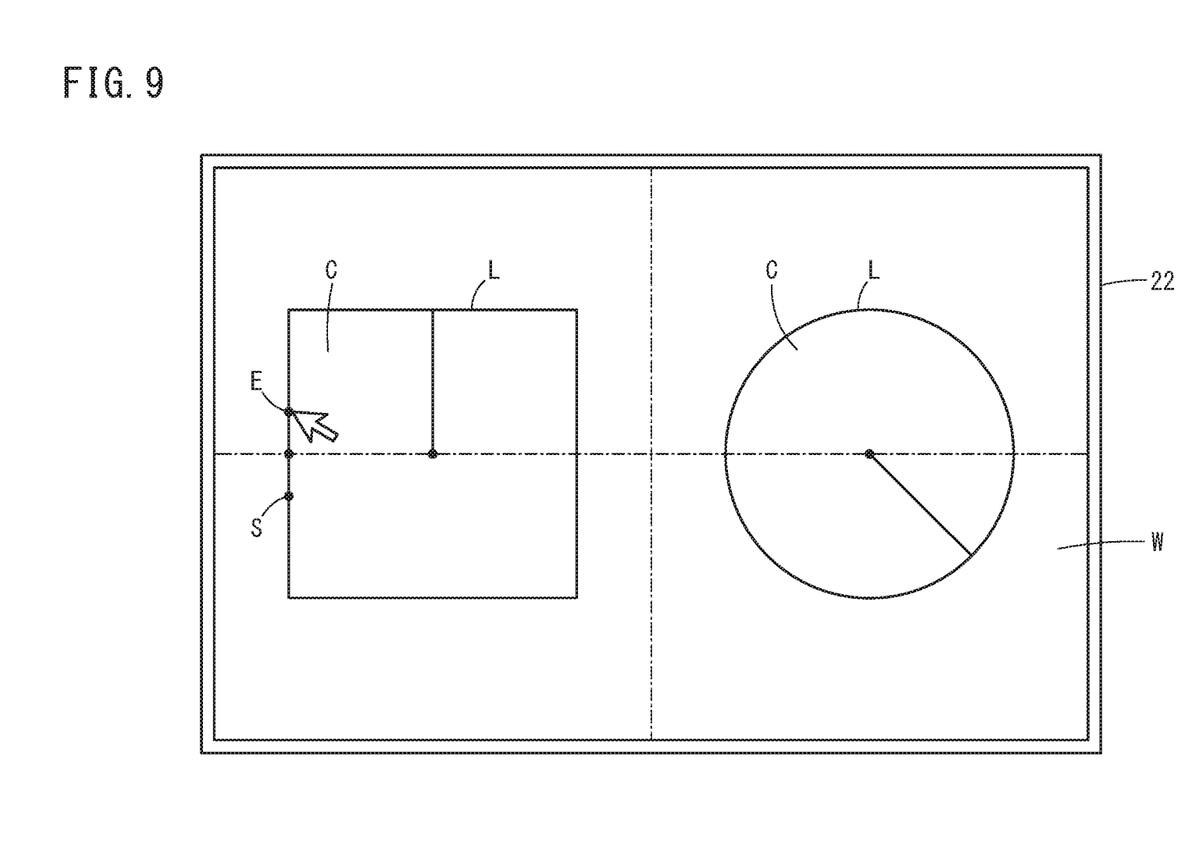
FIG. 9 is a diagram showing a state in which start and end points have been set on a machining line of a workpiece displayed on a display unit in the second embodiment.

At step S15, the core fixing portion setter 36 sets a point E as the end point of the core fixing portion F, and the control goes to step S16. The core fixing portion setter 36 sets the position which the user clicks with the mouse on the machining line L of the workpiece W displayed on the display unit 22 after the setting of the start point S, as the end point E. FIG. 9 is a diagram showing a state in which the start point S and the end point E have been set on the machining line L of the workpiece W displayed on the display unit 22.

Figure 10:
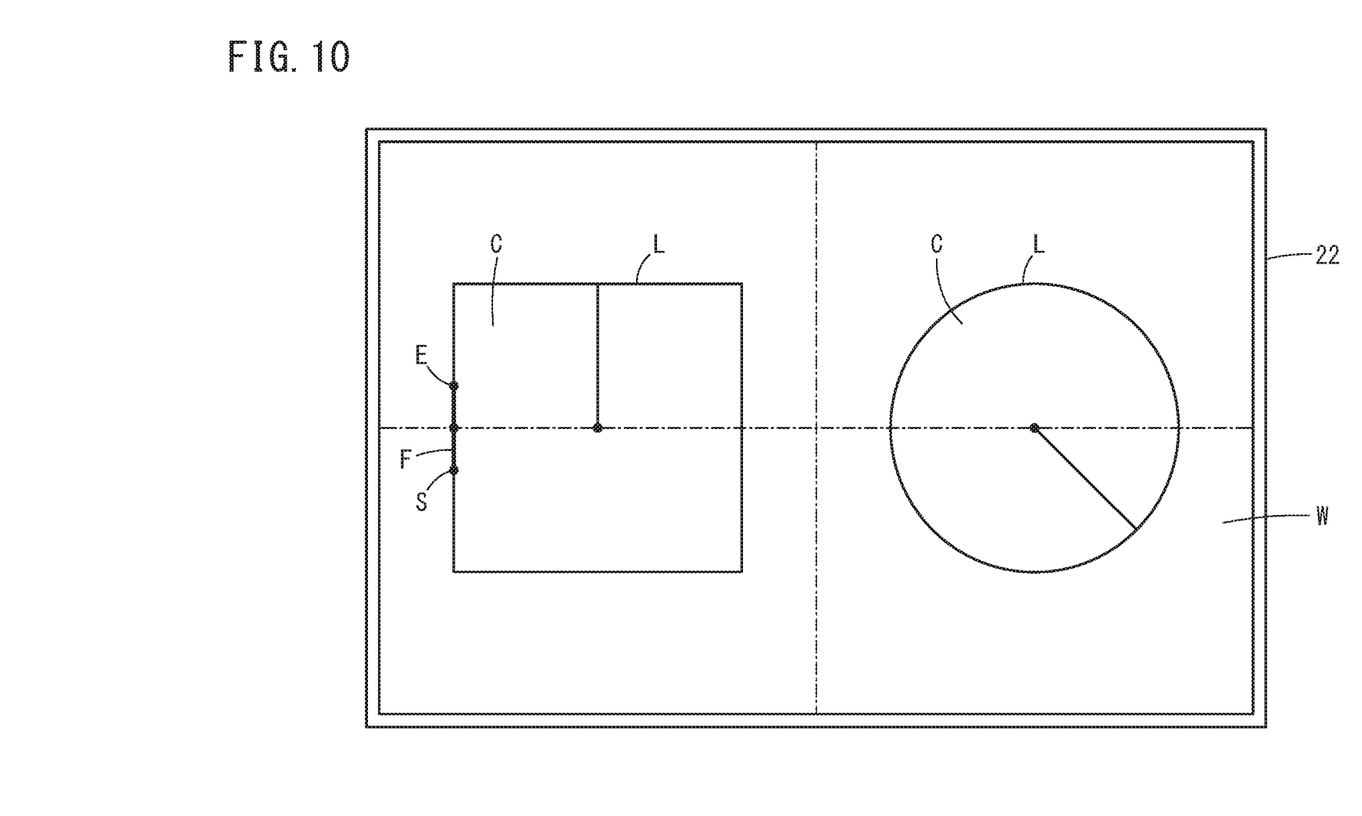
FIG. 10 is a diagram showing an example where a core fixing portion has been set on the machining line of the workpiece displayed on the display unit in the second embodiment.

At step S16, the core fixing portion setter 36 sets the core fixing portion F, and the control goes to step S17. The core fixing portion F is set between the start point S and the end point E. FIG. 10 is a diagram showing an example in which the core fixing portion F has been set on the machining line L of the workpiece W displayed on the display unit 22.

At step S17, it is determined whether or not the NC program creator 38 is in the NC program generation mode. When the NC program generation mode is in progress, the control goes to step S18; otherwise, the control goes to step S11.

At step S18, the NC program creator 38 creates an NC program and terminates the operation. The NC program creator 38 creates the NC program based on the machining shape created at step S12 and the core fixing portion F set at step S16.

Figure 11:
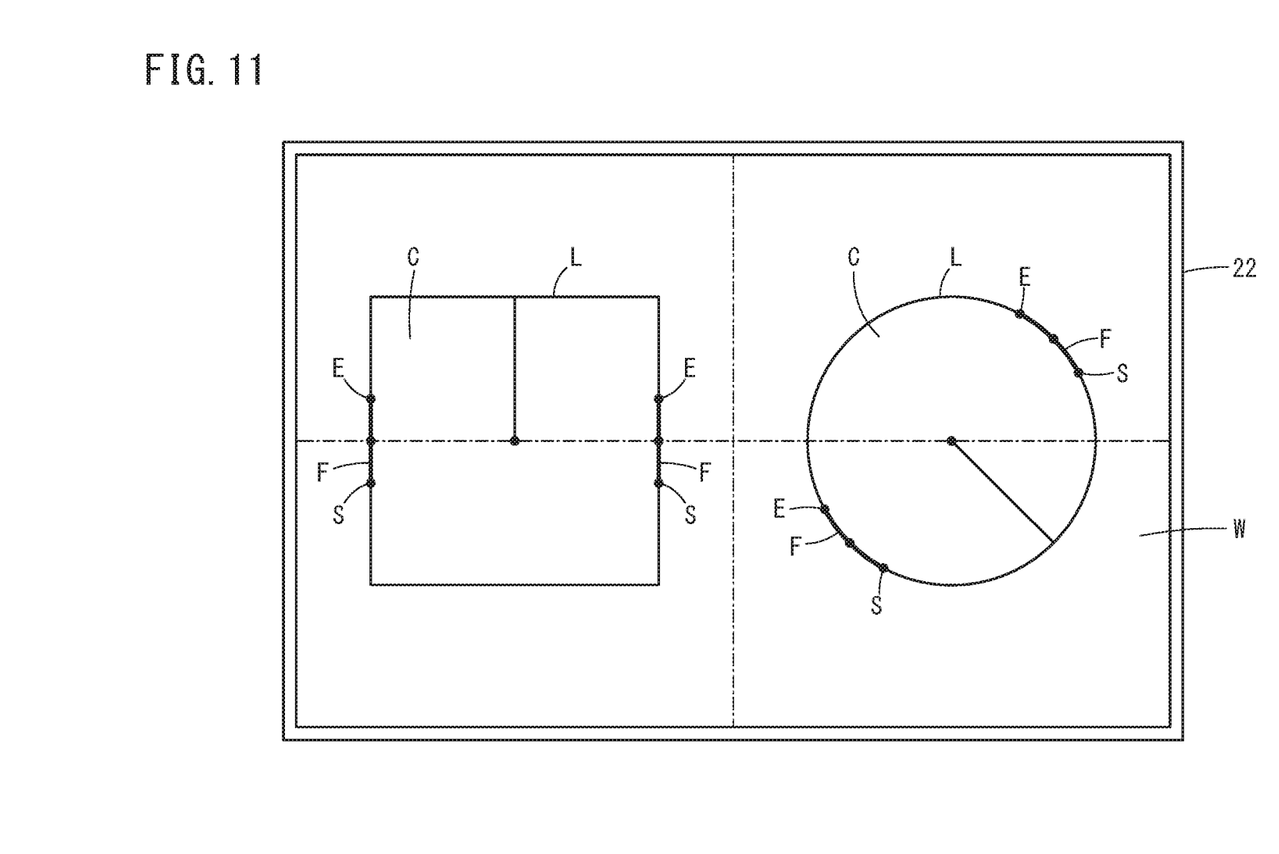
FIG. 11 is a diagram showing a display example on the display unit in a state where core fixing portions have been set in the second embodiment.

FIG. 11 is a diagram showing a display example on the display unit 22 after the setting of core fixing portions F have been completed. As long as the user continues to select the core fixing portion setting mode, the decisions at step S11 and step S17 are denied and the procedures at steps S13 to S16 are repeated. Thus, multiple core fixing portions F can be set, as shown in FIG. 11.
[Operation and Effect]

In this embodiment, the core fixing portion setter 36 designates two points, that is, the start point S and the end point E, which the user designates on the machining line L point by operating the input unit 20, to set a core fixing portion F therebetween. The NC program creator 38 creates an NC program so that the core C is fixed to the workpiece W in the core fixing portion F. As a result, the user needs to designate only the positions of the start point S and the end point E to set a core fixing portion F in a desired location on the machining line L and create an NC program that can fix the core in the core fixing portion F. Thus, it is possible to reduce the burden on the user.

Third Embodiment

The third embodiment is configured such that when core fixing portions F are set for one core C, corresponding core fixing portions F' are created for another core C' of a similar shape.

Figure 12:
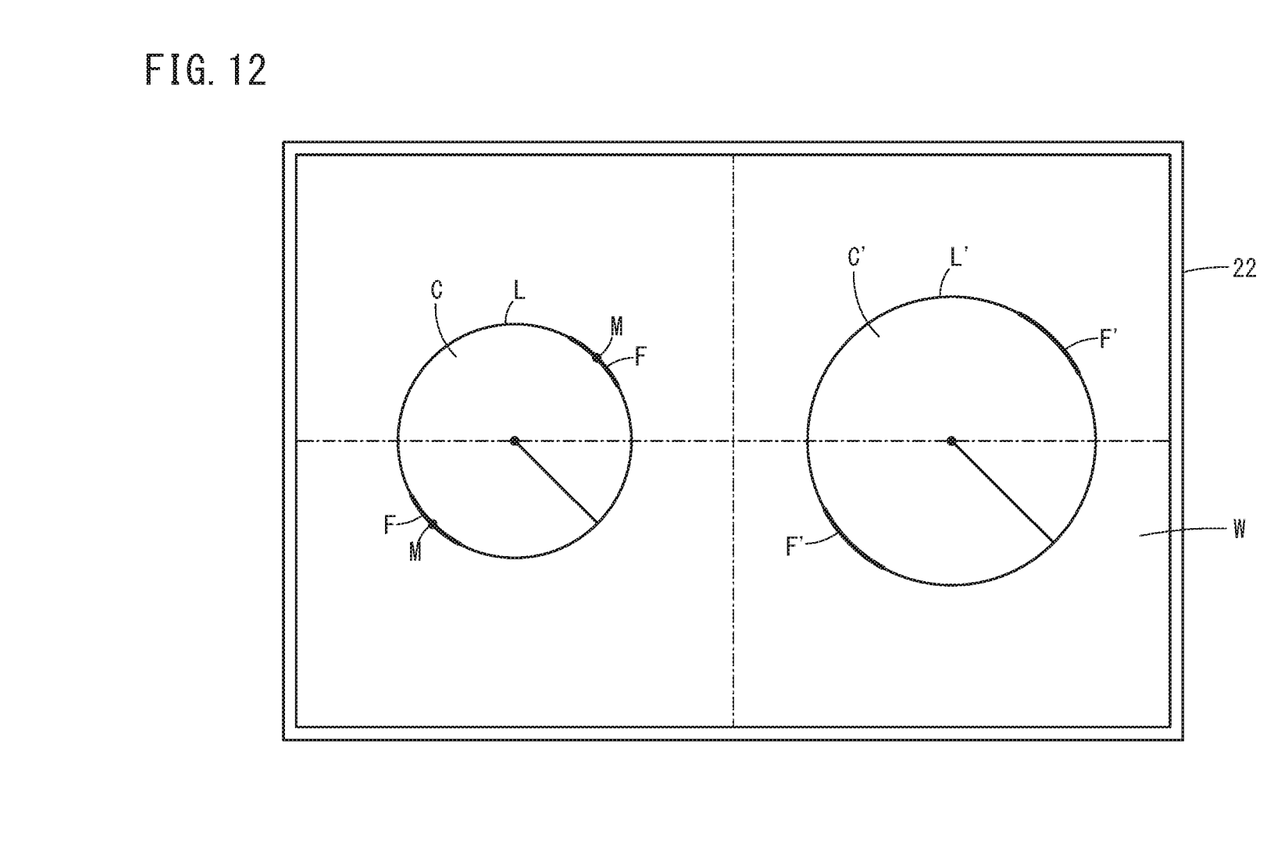
FIG. 12 is a diagram showing a display example on a display unit when core fixing portions have been set in the third embodiment.

FIG. 12 is a diagram showing a display example on the display unit 22 when the setting of the core fixing portions F and F' have been completed. The shape of the core C on the left side and the shape of the core C' on the right side in FIG. 12 are similar though they are different in size. For example, the core fixing portion setter 36 sets the point designated by the user on the machining line L of the core C on the left side of FIG. 12, through the input unit 20. Then, the core fixing portion setter 36 sets core fixing portions F respectively including the midpoints M along the machining line L. Thereafter, the core fixing portion setter 36 sets core fixing portions F' on the machining line L' of the core C' on the right side of FIG. 12, in locations corresponding to the core fixing portions F of the left core C.
[Operation and Effect]

In this embodiment, the core fixing portion setter 36 designates a point on the machining line L of one core C as the midpoint M of a core fixing portion F by operating the input unit 20, to set the core fixing portion F including the point as the midpoint M along the machining line L. Further, the core fixing portion setter 36 sets, in a different core C' similar to the core C with the midpoint M set therein, a core fixing portion F' in the position located corresponding to the core fixing portion F with the midpoint M set therein. Therefore, when there are multiple cores C, C' having similar shapes to one another, it is possible to automatically set multiple core fixing portions F' (other the core fixing portion F) for the multiple similar cores C' by designating a point to be the midpoint M for one core C only, whereby the burden on the user can be alleviated.

OTHER EMBODIMENTS

Although the present invention has been described with reference to the embodiments, the technical scope of the present invention is not limited to that described in the above embodiments. It goes without saying that various modifications or improvements can be added to the above embodiments. It is obvious from the scope of the claims that modes added with such modifications or improvements can be included in the technical scope of the present invention.

In the first embodiment, the user clicks a point on the machining line L of the workpiece W displayed on the display unit 22 with the mouse to set the midpoint M of a core fixing portion F. However, as long as a core fixing portion F is created in a range including the point the user clicked with the mouse on the machining line L of the workpiece W displayed on the display unit 22, the point that the user clicked need not be set to be the midpoint of the core fixing portion F. Further, the position clicked by the user may be set as an end, i.e., the start or end point of the core fixing portion F.

Technical Ideas Obtained from the Embodiments

Technical ideas that can be grasped from the above embodiments will be described below.

A program creation apparatus (10) for creating a program that controls a wire electrical discharge machine (12) includes: a display unit (22) configured to display a machining shape of a workpiece (W) that is input by a user through an input unit (20); a core fixing portion setter (36) configured to set a predetermined range including a point on a machining line (L) between the workpiece (W) and a core (C) to be formed by machining the workpiece (W), specified on the display unit (22) with the machining shape of the workpiece displayed thereon, by the user through the input unit (20), as a core fixing portion (F) for fixing the core (C) to the workpiece (W); and a program creator (38) configured to create a program that causes the wire electrical discharge machine (12) to fix the core (C) to the workpiece (W) in the set core fixing portion (F) while machining the workpiece (W) according to the input machining shape thereof. This configuration enables the user to set a core fixing portion (F) at a desired position on the machining line (L) by simply designating a point on the machining line (L) and create a program for core fixing in the core fixing portion (F). As a result, it is possible to reduce the burden on the user.

In the above program creation apparatus (10), the core fixing portion setter (36) sets a core fixing portion (F) that fixes the core (C) to the workpiece (W) so that the point specified on the machining line (L) by the user through the input unit (20) will form a midpoint (M) of the core fixing portion (F). As a result, the position specified on the machining line (L) by the user forms the midpoint of the core fixing portion (F), hence the user can specify a core fixing portion (F) on the machining line (L) without considering the machining direction thereat.

In the above program creation apparatus (10), the core fixing portion setter (36) sets a core fixing portion (F) that fixes the core (C) to the workpiece (W) so that the point specified on the machining line (L) by the user through the input unit (20) will form a start point (S) of the core fixing portion (F). This configuration enables the user to set a core fixing portion (F) having a point arbitrarily designated by the user on the machining line (L) through the input unit (20) as the start point, by simply designating a position on the machining line (L) and create a program for core fixing in the core fixing portion (F). As a result, it is possible to reduce the burden on the user.

In the above program creation apparatus (10), the core fixing portion setter (36) sets a core fixing portion (F) that fixes the core (C) to the workpiece (W) so that the point specified on the machining line (L) by the user through the input unit (20) will form an end point (E) of the core fixing portion (F). This configuration enables the user to set a core fixing portion (F) having a point designated by the user through the input unit (20) as the end point, by simply designating a position on the machining line (L) and create a program for core fixing in the core fixing portion (F). As a result, it is possible to reduce the burden on the user.

In the above program creation apparatus (10), the core fixing portion setter (36) may set the core fixing portion (F) on the machining line (L) so as to have a length that is specified by the user through the input unit (20). This configuration makes it possible for the user to easily set a core fixing portion (F) having a desired length as the core fixing length so that the length of the core fixing portion (F) can be set arbitrarily.

In the above program creation apparatus (10), the core fixing portion setter (36) may set the core fixing portion (F) in a line segment between two points on the machining line (L) that are specified by the user through the input unit (20). This configuration enables the user to set a core fixing portion (F) at an arbitrary position on the machining line (L) by simply specifying two points, and create a program for core fixing in the core fixing portion (F). As a result, it is possible to reduce the burden on the user.

In the above program creation apparatus (10), when the machining shape includes another core (C') having a similar shape to the core (C), the core fixing portion setter (36) sets a portion on a machining line (L') between the workpiece (W) and the other core (C'), corresponding to the core fixing portion (F) set on the machining line (L) between the workpiece (W) and the core (C), as a core fixing portion (F') of the other core (C'). Thereby, when there are multiple cores (C, C') having similar shapes to one another, this configuration makes it possible to automatically set another core fixing portion (F') for the other core (C') by only designating the position of the core (C), whereby the burden on the user can be alleviated.

What is claimed is:

1. A program creation apparatus for creating a program that controls a wire electrical discharge machine, comprising:
    a display unit configured to display a machining shape of a workpiece that is input by a user through an input unit;
    a core fixing portion setter sets as a midpoint, a point that is specified by the user on the display unit on which the machining shape of the workpiece is displayed through use of the input unit, the midpoint is located on a machining line between the workpiece and a first core to be formed by machining the workpiece, and the core fixing portion setter sets a core fixing portion that fixes the first core to the workpiece so that the midpoint specified by the user forms a middle point of the core fixing portion; and
    a program creator creating a program that causes the wire electrical discharge machine to fix the core to the workpiece in the set core fixing portion while machining the workpiece according to the input machining shape thereof;
    wherein in a case where the machining shape includes a second core having a same shape as the first core but of a different size than the first core, the core fixing portion setter sets a portion on a machining line between the workpiece and the second core, corresponding to the core fixing portion set on the machining line between the workpiece and the first core, as a core fixing portion of the second core.

2. The program creation apparatus according to claim 1, wherein the core fixing portion setter sets the core fixing portion on the machining line so as to have a length that is specified by the user through the input unit.

3. A program creation method for use in a program creation apparatus for creating a program that controls a wire electrical discharge machine, wherein the program creation apparatus includes a display unit configured to display a machining shape of a workpiece that is input by a user through an input unit, comprising:
    a core fixing portion setting step of setting, as a midpoint, a point that is specified on the display unit on which the machining shape of the workpiece is displayed by the user through use of the input unit, the midpoint is located on a machining line between the workpiece and a first core to be formed by machining the workpiece, and setting a core fixing portion that fixes the first core to the workpiece so that the midpoint specified by the user forms a middle point of the core fixing portion; and a program creation step of creating a program that causes the wire electrical discharge machine to fix the core to the workpiece in the set core fixing portion while machining the workpiece according to the input machining shape thereof;

wherein in a case where the machining shape includes a second core having a same shape as the first core but of a different size than the first core, the core fixing portion setting step is performed to set a portion on a machining line between the workpiece and the second core, corresponding to the core fixing portion set on the machining line between the workpiece and the first core, as a core fixing portion of the second core.

4. The program creation method for use in a program creation apparatus according to claim 3, wherein the core fixing portion setting step is performed to set the core fixing portion on the machining line so as to have a length that is specified by the user through the input unit.

* * * * *